(No Model.)

J. W. TUTTLE.
TAG ATTACHING DEVICE.

No. 318,583. Patented May 26, 1885.

Witnesses.
S. N. Piper
Ernest P. Pratt

Inventor
John W. Tuttle
by R H Eddy atty.

UNITED STATES PATENT OFFICE.

JOHN WENTWORTH TUTTLE, OF WATERTOWN, MASSACHUSETTS.

TAG-ATTACHING DEVICE.

SPECIFICATION forming part of Letters Patent No. 318,583, dated May 26, 1885.

Application filed March 23, 1885. (No model.)

*To all whom it may concern:*

Be it known that I, JOHN WENTWORTH TUTTLE, of Watertown, in the county of Middlesex, of the Commonwealth of Massachusetts, have invented a new and useful improvement in tag attachments or devices for attaching tags or various other articles to goods; and I do hereby declare the same to be described in the following specification, and represented in the accompanying drawings, of which—

Figure 1:
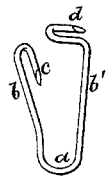
Figure 2:
Figure 3:
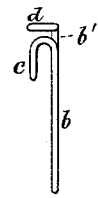
Figure 4:
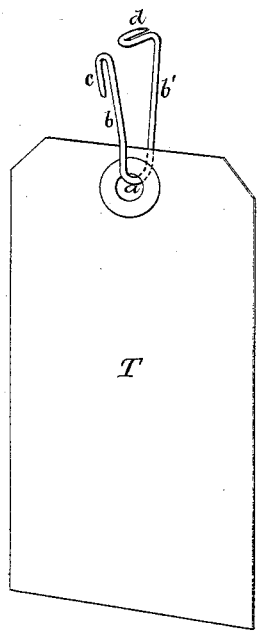

Figure 1 is a perspective view, Fig. 2 a top view, and Fig. 3 a side elevation, of one of my improved tag attachments. Fig. 4 is a perspective view of a tag with the attachment applied to it.

The nature of my invention is defined in the claim hereinafter presented.

The tag attachment is somewhat analogous to that for which a Patent No. 283,169 has been granted to me, it being a forked wire spring having its prongs terminating in hooks. My patented tag attachment was bent near the end of each of its prongs both inwardly and outwardly, to cause it to have at such ends hooks having points or barbs projecting outwardly in opposite directions relatively to each other, the two hooks being in the same plane; but in my present improvement the hook of one prong turns downward in a plane at right angles or thereabout to the plane of the other.

In the drawings, the tag attachment is shown as a piece of wire of suitable length, hooked or bent at or near its middle, so as to form the article as a forked spring having two elastic prongs, $b\ b'$, standing obliquely to each other, as shown, such wire at the bend having an eye, $a$, of circular or horseshoe or other proper form. Such eye serves to connect the attachment with a tag or other article to be supported by it. Furthermore, the prong $b$ is pointed at its end and bent downward laterally into or about into parallelism with the rest of the prong, so as to form the prong with a hook, $c$, the plane of which is at angles to that of the hook $d$ of the prong $b'$, such hook $d$ being formed by first bending the wire in a direction toward the other prong, and next bending at its middle horizontally, or thereabout, the part of the wire so bent downward, so as to cause it to take the form of a hook having its barb pointing in a direction away from the hook of the fellow prong.

In using the attachment one of its hooked prongs is to be inserted in the hole or eye of the tag, so as to cause the tag to hang from the eye or middle of the attachment, as shown in Fig. 4, in which such tag is represented at T. Next the point of the hook $c$ is to be inserted into the bag or article to which the tag is to be attached, and the attachment is to be pulled downward to cause the barb of the hook to fully enter such article. Next, the prong $b'$ of the attachment is to be sprung toward the prong $b$, and the point of the hook $d$ of the prong $b'$ is to be inserted in the bag or article. The prong $b'$ of the attachment is next to be allowed to spring away from the prong $b$, so as to cause the hook $d$ to enter the said bag or article. As the planes of the two hooks are at or nearly at right angles to each other, each of the hooks will operate to prevent the other from being accidentally extracted from the bag or article.

It is generally much easier to apply the improved tag attachment to a bag or article than it is to apply thereto one of the kind hereinbefore mentioned, as shown in the said Patent No. 283,169.

I do not claim a tag-hook made as represented and claimed in the United States Patent No. 263,601—that is, as constructed of a single length of wire bent at the middle thereof into a circular ring or loop, and projecting thence radially and having one prong terminating in a hook and the other in a loop adapted to embrace the hook and guard its point, the hook being automatically carried into the guard-loop by the elasticity of the central ring—as my tag attachment differs materially therefrom in having hooks to both its prongs with one of such hooks projecting downward relatively to its prong, and the other extending from its prong toward the other prong, and thence in an opposite direction, whereby the planes of the two hooks, if extended, would intersect at angles to each other.

I claim—

As an improved article of manufacture, the tag attachment, substantially as set forth, consisting of a piece of wire bent at its middle in the form of an eye or hook, and having the prongs $b\ b'$, extending therefrom, terminating in hooks $c\ d$, one of which turns downwardly into or about into parallelism with the rest of the prong, and the other projects inwardly toward the first, and thence outwardly in an opposite direction, all being essentially as represented.

JOHN WENTWORTH TUTTLE.

Witnesses:
R. H. EDDY,
ERNEST B. PRATT.